United States Patent
Wu

(10) Patent No.: US 12,368,951 B2
(45) Date of Patent: *Jul. 22, 2025

(54) MOTION SENSOR OUTPUTTING DIFFERENT IMAGE FORMAT AND MOTION DETECTION SYSTEM USING THE SAME

(71) Applicant: PixArt Imaging Inc., Hsin-Chu County (TW)

(72) Inventor: Chih-Huan Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,094

(22) Filed: Jun. 18, 2024

(65) Prior Publication Data

US 2024/0340528 A1 Oct. 10, 2024

Related U.S. Application Data

(62) Division of application No. 17/951,221, filed on Sep. 23, 2022, now Pat. No. 12,114,063.

(51) Int. Cl.
*H04N 23/65* (2023.01)
*H04N 23/667* (2023.01)
*H04N 25/42* (2023.01)
*H04N 25/46* (2023.01)
*H04N 25/47* (2023.01)

(52) U.S. Cl.
CPC ......... *H04N 23/651* (2023.01); *H04N 23/667* (2023.01); *H04N 25/42* (2023.01); *H04N 25/46* (2023.01); *H04N 25/47* (2023.01)

(58) Field of Classification Search
None
See application file for complete search history.

(56) References Cited

U.S. PATENT DOCUMENTS

| | | | |
|---|---|---|---|
| 11,108,957 B1 * | 8/2021 | Oh | H04N 23/667 |
| 2014/0009648 A1 * | 1/2014 | Kim | H04N 25/705 |
| | | | 348/272 |
| 2016/0037110 A1 * | 2/2016 | Choi | H04N 23/651 |
| | | | 348/294 |
| 2017/0054930 A1 * | 2/2017 | Ohmaru | H04N 25/77 |
| 2018/0191972 A1 * | 7/2018 | Berner | H04N 25/47 |
| 2020/0342607 A1 * | 10/2020 | Hoshino | H04N 19/137 |
| 2023/0156323 A1 * | 5/2023 | Hanzawa | H04N 23/651 |
| | | | 348/143 |
| 2023/0217100 A1 * | 7/2023 | Ho | H04N 23/61 |
| | | | 348/207.1 |

FOREIGN PATENT DOCUMENTS

WO WO-2024024148 A1 * 2/2024

* cited by examiner

*Primary Examiner* — Paul M Berardesca
(74) *Attorney, Agent, or Firm* — WPAT, PC

(57) ABSTRACT

There is provided a motion sensor including a pixel array and a processor. The motion sensor is embedded with multiple power consumption modes. In one of the multiple power consumption modes, the pixel array outputs image frames having different frame formats. The processor processes the image frames having different frame formats respectively using different algorithms so as to achieve the purposes of low power consumption and high detection sensitivity.

17 Claims, 4 Drawing Sheets

MOTION SENSOR OUTPUTTING DIFFERENT IMAGE FORMAT AND MOTION DETECTION SYSTEM USING THE SAME

RELATED APPLICATIONS

The present application is a divisional application of U.S. application Ser. No. 17/951,221, filed on Sep. 23, 2022, the disclosure of which is hereby incorporated by reference herein in its entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a motion sensing technology and, more particularly, to a motion sensor and a motion detection system using the same that achieve the purposes of power saving and maintaining detection frequency through changing the frame format in a low power mode.

2. Description of the Related Art

When a motion detection sensor is applied to a security system, a low power mode is entered when no condition is detected for a predetermined time interval. However, in the low power mode, the detection sensitivity should still be maintained higher than a certain level in order not to degrade the security performance. In other words, although the power consumption and the detection sensitivity of a security device are more or less mutually exclusive, preferably they can be taken into consideration together in order to achieve the purposes of low power consumption and high detection sensitivity.

In current security systems, consuming power is generally reduced by changing a frame rate. For example, if no motion is detected for a longer time, the frame rate is continuously decreased to a lower level. However, when the frame rate is lower, the detection sensitivity becomes lower.

Accordingly, the present disclosure provides a motion sensor and a motion detection system using the same that have low power consumption and high detection sensitivity in a low power mode.

SUMMARY

The present disclosure provides a motion sensor and a motion detection system using the same that achieve the purposes of low power consumption and high detection sensitivity by changing a frame format from a pixel array.

The present disclosure further provides a motion sensor and a motion detection system using the same that achieve the purposes of low power consumption and high detection sensitivity by using different algorithms of a processor of the motion sensor to identify a motion corresponding to different frame formats.

The present disclosure provides a motion sensor including a pixel array and a processor. The pixel array respectively outputs a first image frame and a second image frame corresponding to different power modes. The first image frame contains an intensity variation of successive sensing frames, and the second image frame contains an intensity distribution of a single sensing frame. The processor performs a motion detection according to the intensity variation of the first image frame, and performs another motion detection according to the intensity distribution of the second image frame.

The present disclosure further provides a motion detection system including a motion sensor and a host. The motion sensor includes a pixel array and a processor. The pixel array outputs a first format image frame, a second format image frame and a third format image frame having frame formats different from one another. The processor processes the first format image frame using a first algorithm to perform motion detection, processes the second format image frame using a second algorithm to perform another motion detection, or directly outputs the third format image frame wherein the third format image frame is raw data outputted by the pixel array using a full resolution. The host receives the raw data of the third format image frame. In a first power mode, the pixel array outputs at least one first format image frame. A second power mode is entered when the processor detects a motion in the first power mode, and the pixel array outputs at least one second format image frame in the second power mode. A third power mode is entered to output at least one third format image frame when the processor detects another motion in the second power mode. A third consuming power of the third power mode is higher than a second consuming power of the second power mode, and the second consuming power of the second power mode is higher than a first consuming power of the first power mode.

The present disclosure further provides a motion sensor including a pixel array and a processor. The pixel array respectively outputs a first image frame, a second image frame and a third image frame corresponding to different power modes. The first image frame contains an intensity variation of successive sensing frames, and the second image frame contains an intensity distribution of a single sensing frame. The processor performs a motion detection according to the intensity variation of the first image frame, performs another motion detection according to the intensity distribution of the second image frame, and directly outputs raw data of the third image frame.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a motion sensor that maintains low power consumption in a low power mode (or called sleep mode) by inserting one image frame having a different frame format (with higher detection ability) at equal-space to increase the motion detection sensitivity. Said one image frame having a different frame format is outputted by a different set of analog circuit in a pixel array, e.g., arranging analog switches in the pixel array to switch between different sets of analog circuits.

Figure 1:
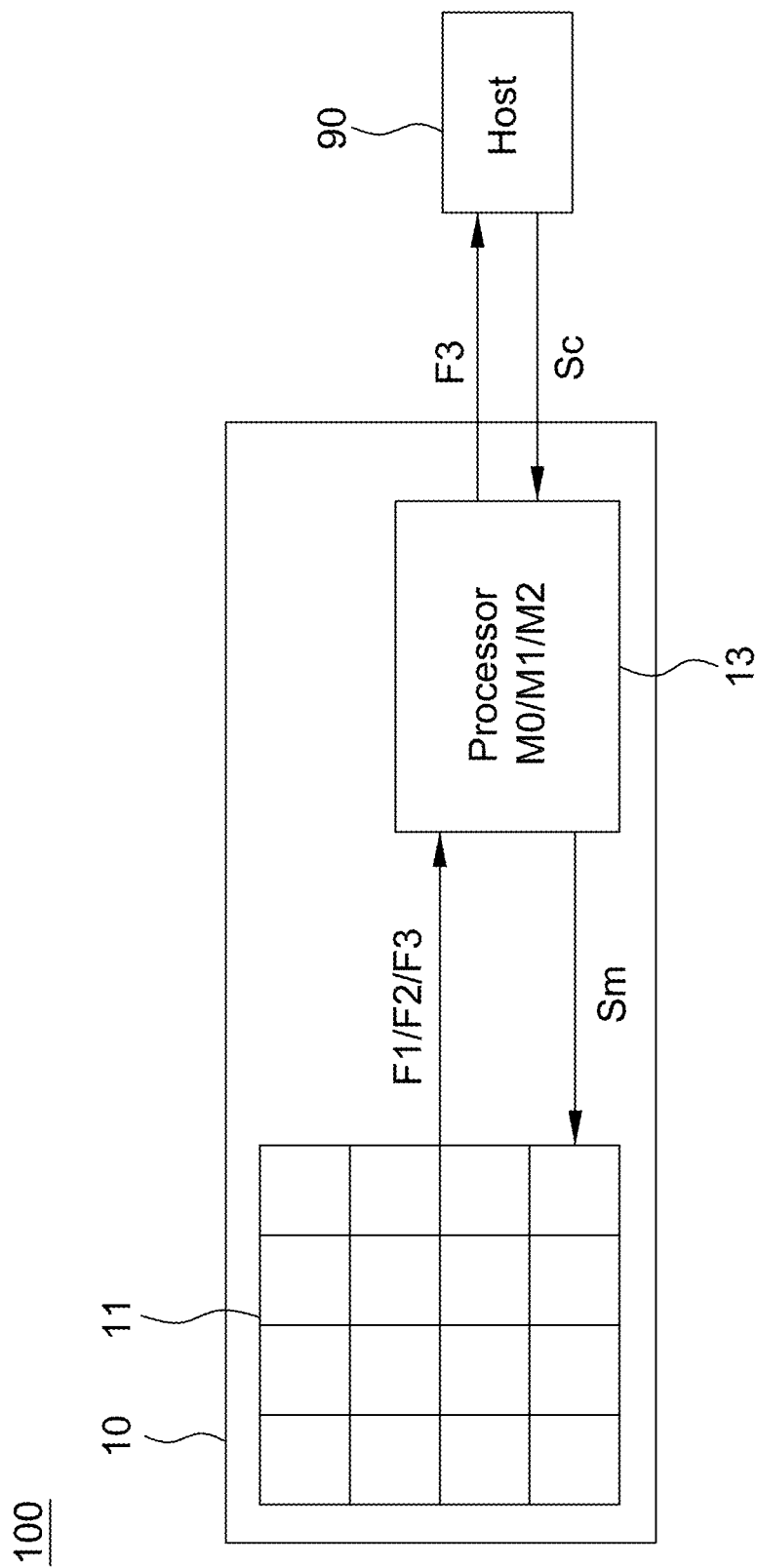
FIG. 1 is a schematic block diagram of a motion detection system according to one embodiment of the present disclosure.

Please refer to FIG. 1, it is a schematic block diagram of a motion detection system 100 according to one embodiment of the present disclosure. The motion detection system 100 includes a motion sensor 10 and a host 90, wherein the host 90 is, for example, an external host at downstream of the motion sensor 10 for performing the image recordation and/or playing streaming data. The motion sensor 10 is coupled to the host 91 via wired or wireless communication technique without particular limitations.

The motion sensor 10 includes a pixel array 11 (e.g., showing by 16 pixels, but not limited to 16) and a processor 13. In some aspects, the motion sensor 10 further includes light source(s) for illuminating a detection area.

The pixel array 11 includes, for example, a CMOS sensor array or other active pixel arrays capable of changing a frame format at the analogous end. The processor 13 is, for example, a micro controller unit (MCU), an application specific integrated circuit (ASIC) or a field programmable gate array (FPGA).

In the present disclosure, the processor 13 is able to operate in multiple power consumption modes (or abbreviated as power modes below), e.g., shown as a first power mode M0, a second power mode M1 and a third power mode M2, wherein a third consuming power of the third power mode M2 is higher than a second consuming power of the second power mode M1, and the second consuming power of the second power mode M1 is higher than a first consuming power of the first power mode M0. The pixel array 11 is arranged to detect identifiable light spectrum depending on applications thereof, including visible light, infrared light and/or far-infrared light, but not limited thereto.

In the present disclosure, the first power mode M0 is referred to that, for instance, the motion sensor 10 does not detect a motion of an object (e.g., human body, but not limited thereto) for a long time, and the pixel array 11 and the processor 13 operate with the minimum power consumption. Meanwhile, in the first power mode M0, if the motion sensor 10 detects the motion of an object, the motion sensor 10 does not directly output an image frame (e.g., third image frame F3 mentioned below) to the host 90 but enters the second power mode M1 to perform another motion detection using an algorithm having higher capability. In other words, the second power mode M1 is entered after the motion sensor 10 detects possible motion(s) of an object in the first power mode M0 (but not sure because a simple algorithm and a low resolution are used for the detection in the first power mode M0), and the pixel array 11 and the processor 13 change to operate with the middle power consumption in the second power mode M1. The host 90 is woken up and the third power mode M2 with the maximum power consumption is entered only when the motion of an object is also detected in the second power mode M1 by the motion sensor 10.

Corresponding to different power modes (e.g., M0, M1 and M2) of the processor 13, the pixel array 11 output image frames using multiple image capture modes (e.g., each having a different frame format from another), e.g., shown as first image frames F1 and second image frames F2 in the first power mode M0, second image frames F2 in the second power mode M1 and third image frames F3 in the third power mode M2 shown in FIGS. 2-4B, wherein a first image frame F1 having a first frame format (or called first image format), a second image frame having a second frame format (or called second image format), and a third image frame F3 having a third frame format (or called third image format). In other words, the pixel array 11 and the processor 13 are arranged to operate at corresponding predetermined modes.

The processor 13 is embedded with a first algorithm for performing a motion detection using the first image frame F1. The processor 13 is further embedded with a second algorithm for performing another motion detection using the second image frame F2. In the third power mode M2, the processor 13 directly outputs the third image frame F3 to the host 90. The third image frame F3 is, for example, raw data outputted by the pixel array 11 using full resolution, and the host 90 processes the third image frame F3 corresponding to different applications, e.g., image recordation and/or detecting motion using a processor thereof. In another aspect, the third image frames F3 contains raw data and information, which is the information of a predetermined object (e.g., human, vehicle) or a predetermined event (e.g., door being opened, fire occurring) identified by the processor 13 in the second image frame F2 or in the third image frames F3.

That is, in one aspect, when the processor 13 identifies the predetermined object or the predetermined event appearing in the second image frame F2, the processor 13 transmits the third image frames F3 as well as the information (identified in the second image frame F2) to the host 90 without identifying the predetermined object or the predetermined event using the third image frames F3; or in another aspect, when the processor 13 identifies the predetermined object or the predetermined event appearing in the second image frame F2, the processor 13 further identifies the predetermined object or the predetermined event using the third image frames F3 and transmits the third image frames F3 as well as the information (identified in the third image frames F3) to the host 90.

The first image frame F1 is an image frame having a first line time outputted by the pixel array 11, wherein the line time is a time interval required by one pixel circuit row of the pixel array 11 to accomplish the exposure and data readout. In one aspect, the first image frame F1 contains an intensity variation of successive sensing frames, and the processor 13 performs the motion detection according to the intensity variation of the first image frame F1. In the present disclosure, the sensing frame is formed by pixel data, before outputted from the pixel array 11, detected by at least a part of pixel circuits of the pixel array 11; whereas, the image frame is formed by pixel data, after outputted from the pixel array 11, detected by the at least a part of pixel circuits of the pixel array 11. According to different frame formats, the image frame is different from the sensing frame. More specifically, an analog circuit of the pixel array 11 processes (e.g., summing, averaging and/or subtracting) sensing frames to form the image frame.

For example, the analog circuit of the pixel array 11 is arranged to output a difference of sensing frames at different times as the first image frame F1. The difference is set as "1" when a gray level variation of corresponding pixels of two sensing frames at different times is larger than a gray level threshold; whereas, the difference is set as "0" when the gray level variation of corresponding pixels of two sensing frames at different times is smaller than the gray level threshold. That is, the first image frame F1 is a frame composed of "1" and "0", and each of the two sensing frames is a frame containing multiple pixel gray levels, each generated by one pixel. After receiving the first image frame F1, the processor 13 counts a number of "1" (or "0") in the first image frame F1. When the number is larger than (or smaller than) a number threshold, a motion is considered. That is, each first image frame F1 contains an intensity variation between different time points. It should be mentioned that contents (determined according to arrangement of the analog circuit) included in the first image frame F1 and how the processor 13 detects a motion accordingly are not limited to those given in the present disclosure. Other methods of performing motion detection according to an intensity variation between successive image frames by the processor 13 are not departing from spirit and scope of the present disclosure.

The second image frame F2 is an image frame having a second line time outputted by the pixel array 11. In one aspect, the second image frame F2 contains an intensity distribution of a single sensing frame, and the processor 13 performs the motion detection according to the intensity distribution of one second image frame F2. For example, an analog circuit of the pixel array 11 calculates a summation or an average of raw data (e.g., binning) of multiple adjacent pixels (e.g., 2×2 (4) pixels or 3×3 (9) pixels according to a size of the pixel array 11 without particular limitations) as the second image frame F2 such that a size of the second image frame F2 is smaller but still keeping sensing information. After receiving the second image frame F2, the processor 13 calculates a shape of a pixel area in the second image frame F2 with gray levels exceeding a gray level threshold. When the shape is confirmed as a predetermined shape, a motion is identified. In another aspect, when the processor 13 identifies, using the second algorithm, predetermine information such as the predetermined object (e.g., human, vehicle) or the predetermined event (e.g., door being opened, fire occurring), a motion is identified. More specifically, the motion mentioned herein includes a predetermined change or a predetermined state contained in the second image frame F2. Similarly, contents (determined according to arrangement of the analog circuit) included in the second image frame F2 and how the processor 13 detects a motion accordingly are not limited to those given in the present disclosure. Other methods of performing motion detection according to an intensity distribution of a single image frame by the processor 13 are not departing from spirit and scope of the present disclosure.

In one aspect, the first image frame F1 having a first frame format is a differential image format, and the second image frame F2 having a second frame format is a non-differential image format. The processor 13 performs motion detection with a first algorithm according to at least one image frame having the first frame format, and performs another motion detection with a second algorithm according to at least one image frame having the second frame format.

In one aspect, a first resolution of the first image frame F1 is lower than a second resolution of the second image frame F2. For example, the pixel array 11 only outputs data of a first number of pixels (e.g., other pixels being deactivated) as contents of the first image frame F1, and the first number is much smaller than a size of the pixel array 11; meanwhile, the pixel array 11 only outputs data of a second number of pixels (e.g., other pixels being deactivated) as contents of the second image frame F2, and the second number is larger than the first number but still much smaller than the size of the pixel array 11. Therefore, a first consuming power of the pixel array 11 for outputting the first image frame F1 is lower than a second consuming power of the pixel array 11 for outputting the second image frame F2. Meanwhile, a first line time of acquiring the first image frame F1 by the pixel array 11 is smaller than a second line time of acquiring the second image frame F2 by the pixel array 11.

Figure 2:
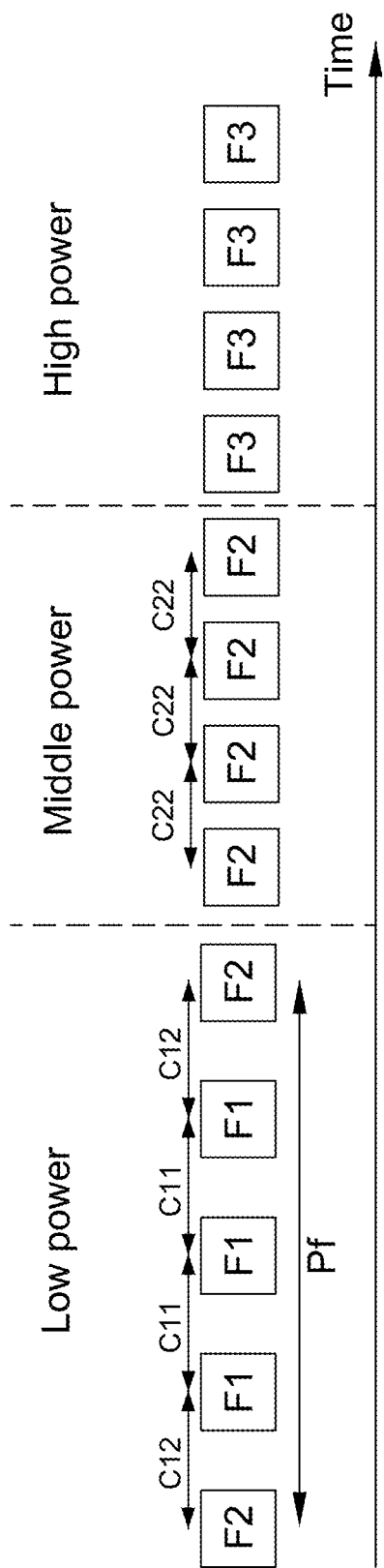
FIG. 2 is an operational schematic diagram of a motion detection system according to one embodiment of the present disclosure.
Figure 4A:
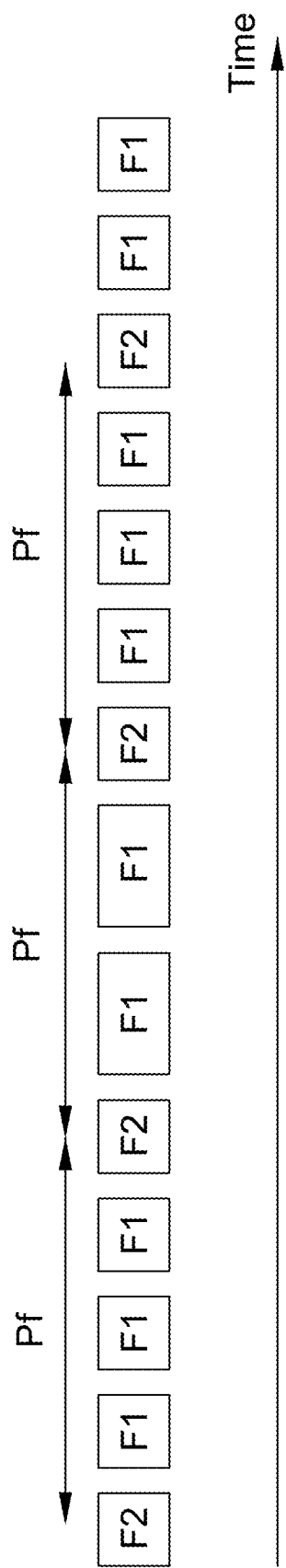
FIGS. 4A and 4B are other operational schematic diagrams of a motion detection system according to some embodiments of the present disclosure.
Figure 4B:
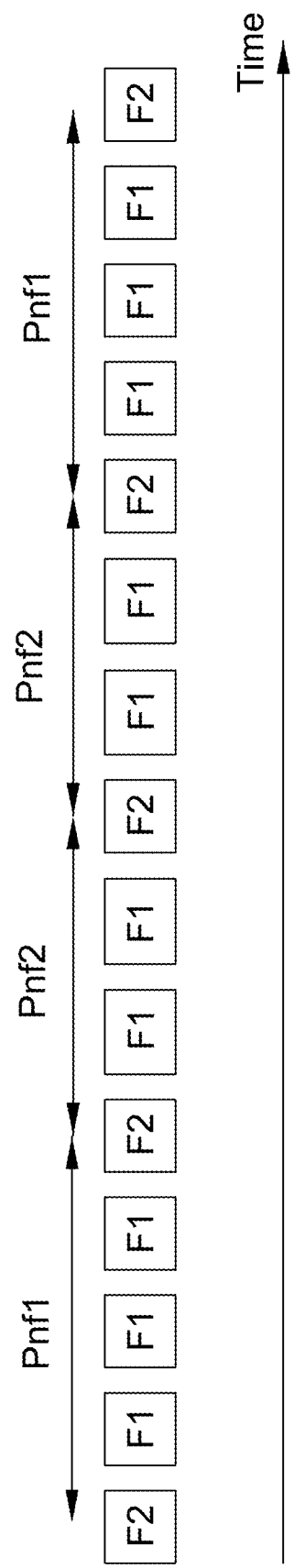

Please refer to FIGS. 2 and 4A-4B, they are operational schematic diagrams according to some embodiments of the present disclosures. FIG. 2 shows the switching between different power modes, and FIG. 4A-4B show the operation of a low power mode.

As shown in FIG. 2, in the first power mode M0 (e.g., shown as Low power), the pixel array 11 continuously outputs multiple first image frames F1 (e.g., shown as three frames) each having a first line time and a first frame format, and outputs one second image frame F2 (as shown in FIG. 4A-4B) having a second line time and a second frame format between two groups of the multiple first image frames F1, wherein the first line time is different from the second line time, and the first frame format is different from the second frame format. Meanwhile, the processor 13 performs motion detection using a first algorithm according to the multiple first image frames F1, and performs the motion detection using a second algorithm according to the one second image frame F2.

In the present disclosure, a first consuming power of the processor 13 for performing the motion detection according to the multiple first image frames F1 is lower than a second consuming power of the processor 13 for performing the motion detection according to the one second image frame F2.

In one aspect, in the first power mode M0, a first frame period C11 of the multiple first image frames F1 is identical to a time interval C12 between the one second image frame F2 and an adjacent first image F1 thereof among the multiple first image frames F1.

In one aspect, in the first power mode M0, a time interval Pf between two adjacent second image frames F2 is fixed, further referring to FIG. 4A.

In another aspect, in the first power mode M0, a number of multiple first image frames F1 between two adjacent second image frames F2 is adjustable, e.g., referring to FIGS. 4A and 4B. One reason of the adjustment is due to the ambient light variation. For example, when ambient light is stronger, a time interval for acquiring each first image frame F1 is shorter such that more first image frames F1 are inserted into two adjacent second image frames F2; on the other hand, when ambient light is weaker, a time interval for acquiring each first image frame F1 is longer such that fewer first image frames F1 are inserted into two adjacent second image frames F2, i.e. using auto exposure mechanism. In another aspect, when the number of multiple first image frames F1 is changed, for maintaining a fixed frame rate, a time interval between two adjacent second image frames F2 is adjusted within a predetermined range.

The second power mode M1 (e.g., shown as Middle power in FIG. 2) is entered when the processor 13 detects a motion according to any one of multiple first image frames F1 and one second image frame F2 in the first power mode M0. For example, if the processor 13 detects a motion at any one of three first image frames F1, the second power mode M1 is directly entered. The processor 13 sends a mode control signal Sm to inform the pixel array 11 to switch the image capture mode.

As shown in FIG. 2, in the second power mode M1, the pixel array 11 continuously outputs multiple second image frames F2 having a second line time and a second frame format without outputting the first image frame F1. That is, in the second power mode M1, the processor 13 processes an image having higher resolution and identifies the motion using a more complicated algorithm in order to increase the detection accuracy and avoid misjudgement. In one aspect, a second frame period C22 of the multiple second image frames F2 in the second power mode M1 is smaller than or equal to a first frame period C11 of multiple first image frames F1 in the first power mode M0. That is, it is possible to arrange a frame rate in the second power mode M1 to be higher than a frame rate in the first power mode M0.

Next, the third power mode M2 (e.g., shown as High power) is entered when the processor 13 detects a motion in the second power mode M1 so as to output the third image frame F3 to the host 90 for corresponding operations.

Briefly, the pixel array 11 outputs at least one first format image frame F1 in a first power mode M0. When the processor 13 detects a motion in the first power mode M0, a second power mode M1 is entered and the pixel array 11 outputs at least one second format image frame F2. When the processor 13 detects another motion in the second power mode M1, a third power mode M2 is entered to output at least one third format image frame F3 to the host 90.

Figure 3:
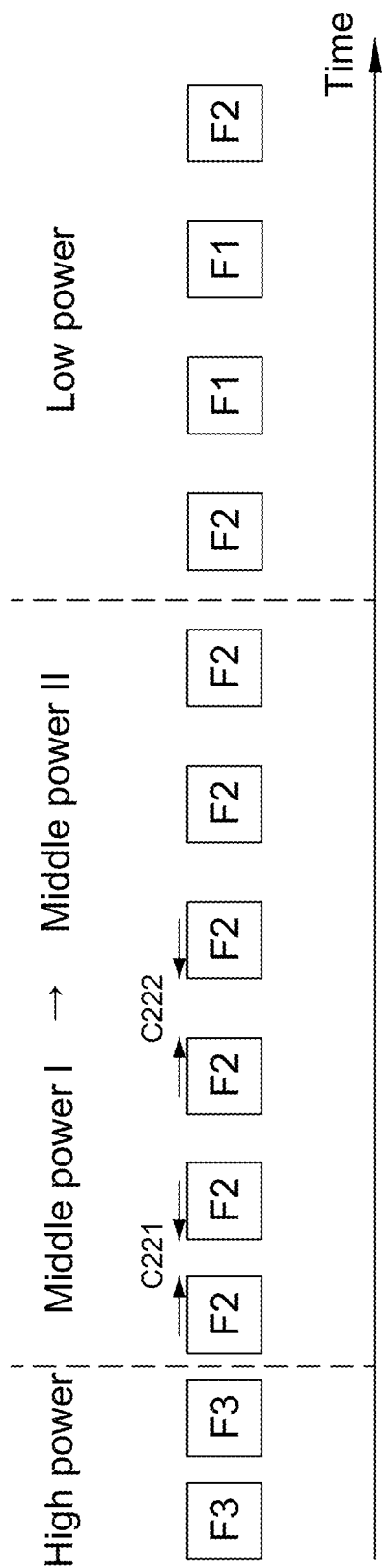
FIG. 3 is another operational schematic diagram of a motion detection system according to one embodiment of the present disclosure.

Please refer to FIG. 3, it is another operational schematic diagram of a motion detection system 100 according to an embodiment of the present disclosure, in which the operation after entering a third power mode M2 is shown. The host 90 sends a control signal Sc to the motion sensor 10 to go back to the second power mode M1 at a predetermined time (e.g., 2 minutes) or a predetermined number of third image frames F3 after entering the third power mode M2 or after confirming (using a processor therein) no object motion according to the third image frame F3. In the second power mode M1, the pixel array 11 and the processor 13 perform the motion detection using the above mentioned method, and thus details thereof are not repeated herein.

In one aspect, when the motion detection system 100 enters the second power mode M1 from the third power mode M2, the motion sensor 10 performs the motion detection according to the second image frame F2 using different frame rates. For example, in the early interval just entering the second power mode M1, it is expected to have a higher possibility to detect a moving object and thus the motion sensor 10 uses a shorter frame period C221 (shown as Middle power I) to perform the motion detection. If no moving object is detected within a first predetermined time interval, a shorter frame period C222 (shown as Middle power II) is used to perform the motion detection. If still no moving object is detected for a second predetermined time interval in the Middle power II, the first power mode M0 is entered, wherein the first predetermined time interval is identical to or different from the second predetermined time interval without particular limitations.

In another aspect, in the second power mode M1, the motion sensor 10 uses a single frame rate to perform the motion detection according to the second image frame F2.

In the present disclosure, said "continuously outputting" is referring to no image frame of a different frame format (or different line time) is outputted. That is, within the continuous outputting interval, the pixel array 11 outputs image frames using the same image capture mode.

It should be mentioned that all values, such as a number of pixels, a number of frames in the present disclosure are only intended to illustrate but not to limit the present disclosure.

As mentioned above, the conventional motion detection sensor will lower the detection sensitivity while entering a low power mode to degrade the performance of a security system. Accordingly, the present disclosure further provides a motion sensor and a motion detection system including the same (e.g., FIG. 1) in which a pixel array outputs image frames having different frame formats (e.g., FIG. 2) using an analog circuit thereof to achieve the purposes of reducing the consuming power and maintaining enough detection sensitivity.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A motion sensor, comprising:
a pixel array, configured to respectively output a first image frame and a second image frame corresponding to different power modes, the first image frame containing an intensity variation of successive sensing frames, and the second image frame containing an intensity distribution of a single sensing frame; and
a processor, configured to perform a motion detection according to the intensity variation of the first image frame, and to perform another motion detection according to the intensity distribution of the second image frame,
wherein the pixel array is configured to successively output first image frames, and output a second image frame between two groups of the first image frames.

2. The motion sensor as claimed in claim 1, wherein a number of the first image frames between two of the second image frames is adjustable.

3. The motion sensor as claimed in claim 1, wherein a time interval between two of the second image frames is fixed.

4. The motion sensor as claimed in claim 1, wherein an analog circuit of the pixel array is configured to output a difference of sensing frames at different times as the first image frame.

5. The motion sensor as claimed in claim 4, wherein
the difference is set as "1" upon a gray level variation of corresponding pixels of two sensing frames at different times being larger than a gray level threshold, and
the difference is set as "0" upon the gray level variation of the corresponding pixels of the two sensing frames at different times being smaller than the gray level threshold.

6. The motion sensor as claimed in claim 5, wherein the processor is configured to compare counts of "1" or "0" in the first image frame with a number threshold as performing the motion detection.

7. The motion sensor as claimed in claim 1, wherein an analog circuit of the pixel array is configured to calculate a binning of raw data of multiple adjacent pixels as the second image frame.

8. The motion sensor as claimed in claim 7, wherein the processor is configured to calculate a shape of a pixel area in the second image frame with gray levels exceeding a gray level threshold as performing the another motion detection.

9. The motion sensor as claimed in claim 7, wherein the processor is configured to identify predetermined information in the second image frame as performing the another motion detection.

10. The motion sensor as claimed in claim 1, wherein
each sensing frame is formed by pixel data, before outputted from the pixel array, detected by at least a part of pixel circuits of the pixel array, and
the first image frame and the second image frame is formed by pixel data, after outputted from the pixel array, detected by the at least a part of pixel circuits of the pixel array.

11. A motion detection system, comprising:
a motion sensor, comprising:
a pixel array, configured to output a first format image frame, a second format image frame and a third format image frame having frame formats different from one another; and
a processor, configured to process the first format image frame using a first algorithm to perform motion detection, process the second format image frame using a second algorithm to perform another motion detection, or directly output the third format image frame, wherein the third format image frame is raw data outputted by the pixel array using a full resolution; and
a host, configured to receive the raw data of the third format image frame, wherein
in a first power mode, the pixel array is configured to output at least one first format image frame,
a second power mode is entered when the processor detects a motion in the first power mode, and the pixel array is configured to output at least one second format image frame in the second power mode,
a third power mode is entered to output at least one third format image frame when the processor detects another motion in the second power mode, and
a third consuming power of the third power mode is higher than a second consuming power of the second power mode, and the second consuming power of the second power mode is higher than a first consuming power of the first power mode,
wherein the pixel array is configured to output successive first format image frames, and output a second format image frame between two groups of the successive first format image frames in the first power mode.

12. The motion detection system as claimed in claim 11, wherein the pixel array is configured to output different format image frames by different sets of analog circuits thereof.

13. The motion detection system as claimed in claim 11, wherein the host is
external to the motion sensor, and
coupled to the motion sensor via wireless communication technique.

14. The motion detection system as claimed in claim 11, wherein the processor is configured not to output the first format image frame or the second format image frame to the host.

15. The motion detection system as claimed in claim 11, wherein the third format image frame further contains predetermined information in the second format image frame identified by the processor.

16. A motion sensor, comprising:
a pixel array, configured to respectively output a first image frame, a second image frame and a third image frame corresponding to different power modes, the first image frame containing an intensity variation of successive sensing frames, and the second image frame containing an intensity distribution of a single sensing frame; and
a processor, configured to
perform a motion detection according to the intensity variation of the first image frame,
perform another motion detection according to the intensity distribution of the second image frame, and
directly output raw data of the third image frame,
wherein the pixel array is configured to successively output first image frames, and output a second image frame between two groups of the first image frames.

17. The motion sensor as claimed in claim 16, wherein the raw data is acquired by the pixel array using a full resolution.

* * * * *